United States Patent
Horizumi (10) Patent No.: US 10,886,807 B2
(45) Date of Patent: Jan. 5, 2021

(54) BRUSHLESS MOTOR AND BRUSHLESS MOTOR CONTROL DEVICE

(71) Applicant: DENSO CORPORATION, Kariya (JP)

(72) Inventor: Rintaro Horizumi, Kariya (JP)

(73) Assignee: DENSO CORPORATION, Kariya (JP)

(*) Notice: Subject to any disclaimer, the term of this patent is extended or adjusted under 35 U.S.C. 154(b) by 280 days.

(21) Appl. No.: 16/175,078

(22) Filed: Oct. 30, 2018

(65) Prior Publication Data

US 2019/0165631 A1 May 30, 2019

(30) Foreign Application Priority Data

Nov. 29, 2017 (JP) ................... 2017-229608

(51) Int. Cl.
| | |
|---|---|
| *H02K 3/28* | (2006.01) |
| *H02K 1/16* | (2006.01) |
| *H02K 3/50* | (2006.01) |
| H02K 11/33 | (2016.01) |

(52) U.S. Cl.
CPC .......... *H02K 3/28* (2013.01); *H02K 1/16* (2013.01); *H02K 3/50* (2013.01); *H02K 11/33* (2016.01); *H02K 2203/06* (2013.01); *H02K 2213/06* (2013.01)

(58) Field of Classification Search
CPC .............. H02K 3/12; H02K 3/14; H02K 3/28
See application file for complete search history.

(56) References Cited

U.S. PATENT DOCUMENTS

| | | | |
|---|---|---|---|
| 2010/0327680 A1 | 12/2010 | Miyachi et al. | |
| 2012/0038238 A1* | 2/2012 | Ishikawa | H02K 19/22 |
| | | | 310/208 |
| 2016/0149476 A1* | 5/2016 | Qin | B62D 5/0421 |
| | | | 180/443 |
| 2020/0052638 A1* | 2/2020 | Kinjo | H02K 3/28 |

FOREIGN PATENT DOCUMENTS

| | | |
|---|---|---|
| JP | 2004-297881 A | 10/2004 |
| JP | 2007-325447 A | 12/2007 |
| JP | 2008-22667 A | 1/2008 |
| JP | 2009-268233 A | 11/2009 |
| JP | 2011-30406 A | 2/2011 |
| JP | 2013-62897 A | 4/2013 |
| JP | 2013-85381 A | 5/2013 |

* cited by examiner

*Primary Examiner* — Ramon M Barrera
(74) *Attorney, Agent, or Firm* — Oliff PLC (57) ABSTRACT

A brushless motor includes a stator, a control device, and a rotor. The stator includes a stator core and windings. The stator core includes teeth arranged next to one another in a circumferential direction and slots formed between the teeth. The windings are inserted into the slots and wound around the stator core as three-phase windings of a plurality of systems. The control device generates a three-phase driving current. The rotor is rotated and driven when the three-phase windings are supplied with the three-phase driving current. The windings are operable independently in each system. At least two windings of different systems and the same phase are arranged mixed in the same slot. The driving current of the same phase is supplied to the two windings of different systems and the same phase arranged in the same slot.

8 Claims, 7 Drawing Sheets

BRUSHLESS MOTOR AND BRUSHLESS MOTOR CONTROL DEVICE

BACKGROUND OF THE INVENTION

The present disclosure relates to a brushless motor and a brushless motor control device.

In an automotive device requiring a high level of safety, such as an electric power steering apparatus (EPS) or a steer-by-wire (SBW) device, it is desirable that a motor that is used as a drive source have redundancy.

Japanese Laid-Open Patent Publication Nos. 2009-268233 and 2008-022667 disclose examples of motors using two or more sets of three-phase windings, with each set supplied with power from a different control device. This obtains a multiplex construction that provides redundancy. In the motor of Japanese Laid-Open Patent Publication No. 2009-268233, the two or more sets of three-phase windings are arranged so that one of the two or more sets is arranged in one slot and another one of the two or more sets is arranged in the next slot. In the motor of Japanese Laid-Open Patent Publication No. 2008-022667, the two or more sets of three-phase windings are arranged so that one set is arranged next to another set in a circumferential direction of a stator.

An increase in the number of sets (number of systems) of the three-phase windings may result in complicated power supply control.

SUMMARY OF THE INVENTION

It is an object of the present disclosure to provide a brushless motor and a brushless motor control device that simplify power supply control for windings of a plurality of systems.

One aspect of the present disclosure is a brushless motor including a stator, a control device, and a rotor. The stator includes a stator core and a plurality of windings. The stator core includes teeth arranged next to one another in a circumferential direction and slots formed between the teeth. The windings are inserted into the slots, and the windings are all wound around the stator core as three-phase windings of a plurality of systems. A control device is configured to generate a three-phase driving current. A rotor is rotated and driven when the three-phase windings are supplied with the three-phase driving current. The windings are operable independently in each system. Some of the windings that are at least two windings of different systems and the same phase are arranged mixed in the same slot. The driving current of the same phase is supplied to the some of the windings of different systems and the same phase arranged in the same slot.

According to the above aspect, the stator of the motor is provided with the windings of the systems that can be operated independently. Among the windings, at least two windings of different systems and the same phase are arranged to be mixed in the same slot of the stator (stator core). A driving current having the same phase is supplied to some of the plurality of windings having different systems and the same phase that are arranged in the same slot. In other words, the motor has redundancy by providing windings of different systems, which are independent from each other in structure, in the same slot. The same driving current is used to allow the systems to be operated as if the windings are of the same system. This simplifies power supply control even though the windings are used for a plurality of systems.

In the above brushless motor, the windings include windings of four or more systems, and the some of the windings of different systems and the same phase are mixed in each of the slots.

According to the above aspect, it is possible to provide a motor having a configuration in which the windings of four or more systems are used so that some of the windings of different systems and the same phase are mixed in each of the slots.

In the above brushless motor, the some of the windings of different systems and the same phase arranged in the same slot each includes a lead wire, and the lead wires are arranged at opposing positions separated by 180° degrees from each other with a rotation shaft of the rotor located in between.

According to the above aspect, the lead wires of the windings of different systems and the same phase arranged in the same slot are arranged at opposing positions separated by 180° with the rotation shaft of the rotor located in between. Therefore, the magnetic field generated around the lead wire when energized can be offset in the vicinity of the rotation shaft. Thus, even when the specification of the motor is such that the sensor magnets are arranged on the rotation shaft, the influence on the magnetic field of the sensor magnet can be reduced.

In the above brushless motor, the some of the windings of different systems and the same phase arranged in the same slot are arranged in a state in which their radial positions are alternately switched in the slots of a predetermined interval.

According to the above aspect, the windings of different systems and the same phase arranged in the same slot are arranged in a state in which their radial positions are alternately switched in slots of a predetermined interval. In other words, since the winding form of the winding is symmetrical in different systems, for example, when the specification of the motor is such that the segment conductors having a predetermined length are connected to form windings, common components can be used for the segment conductors.

In the above brushless motor, the control device includes a plurality of drivers that generate and supply the driving current, and the drivers are allocated to each winding of the plurality of systems.

According to the above aspect, the control device is configured so that independent drivers are allocated to each of the windings of the systems. Therefore, it is possible to provide redundancy not only for the winding but also for the driver.

In the above brushless motor, the control device includes a plurality of controllers configured to independently control the plurality of drivers.

According to the above aspect, since the control device has a configuration in which the controller is allocated to each of the plurality of drivers, it is possible to provide redundancy not only to the windings and the driver but also to the controller.

In the above brushless motor, the control device includes a common driver that generates and supplies the driving current, and the common driver is allocated to the some of the windings of different systems in the same slot.

According to the above aspect, since the control device has a configuration in which the common driver is allocated to the windings of different systems arranged in the same slot, a common driver and a common controller controlling the driver can be used while providing redundancy to the windings.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF PREFERRED EMBODIMENTS

One embodiment of a brushless motor will now be described.

Figure 1:
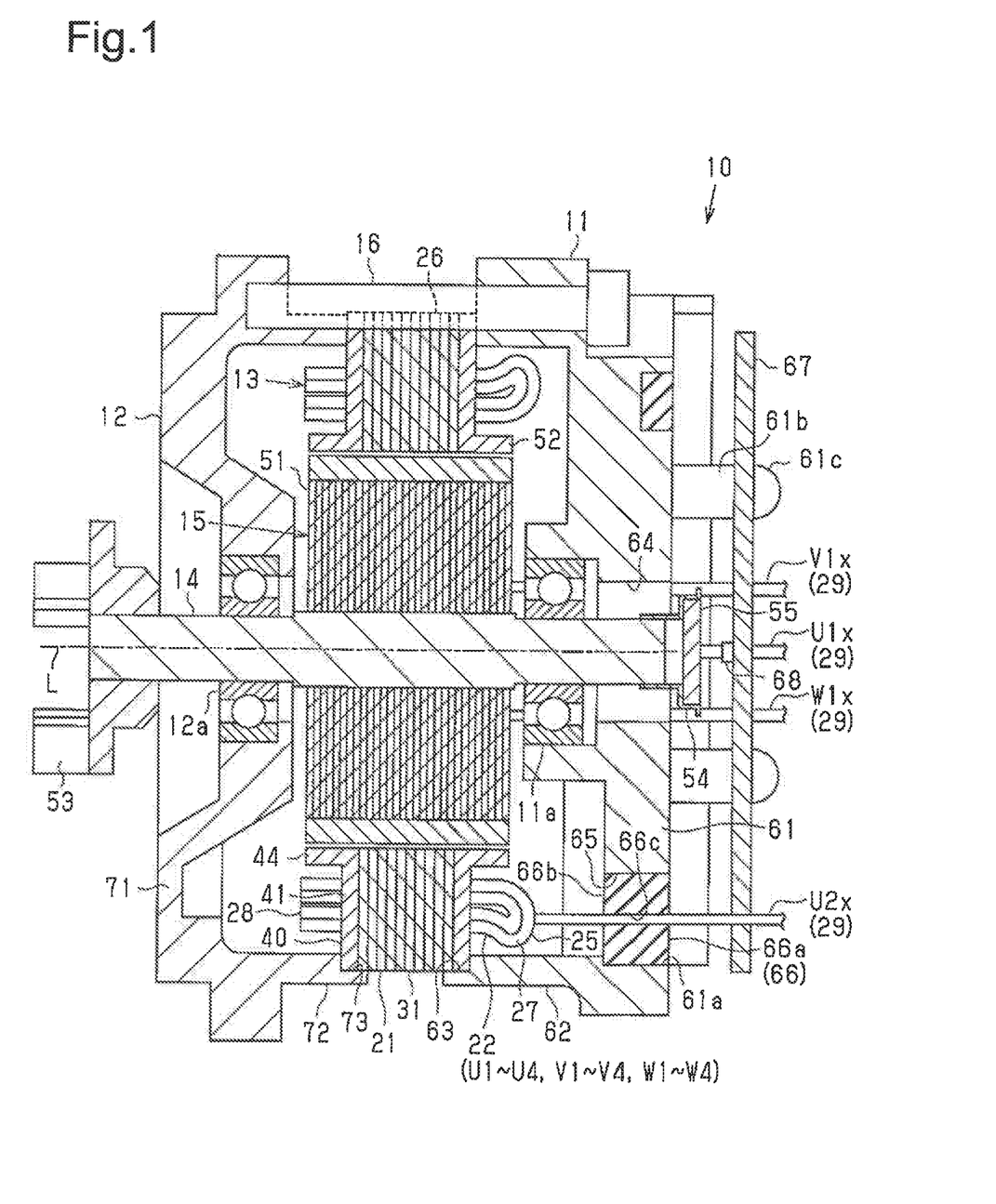
FIG. 1 is a cross-sectional view (cross-sectional view taken along line A-A in FIG. 2) of a motor according to one embodiment of the present disclosure.
Figure 2:
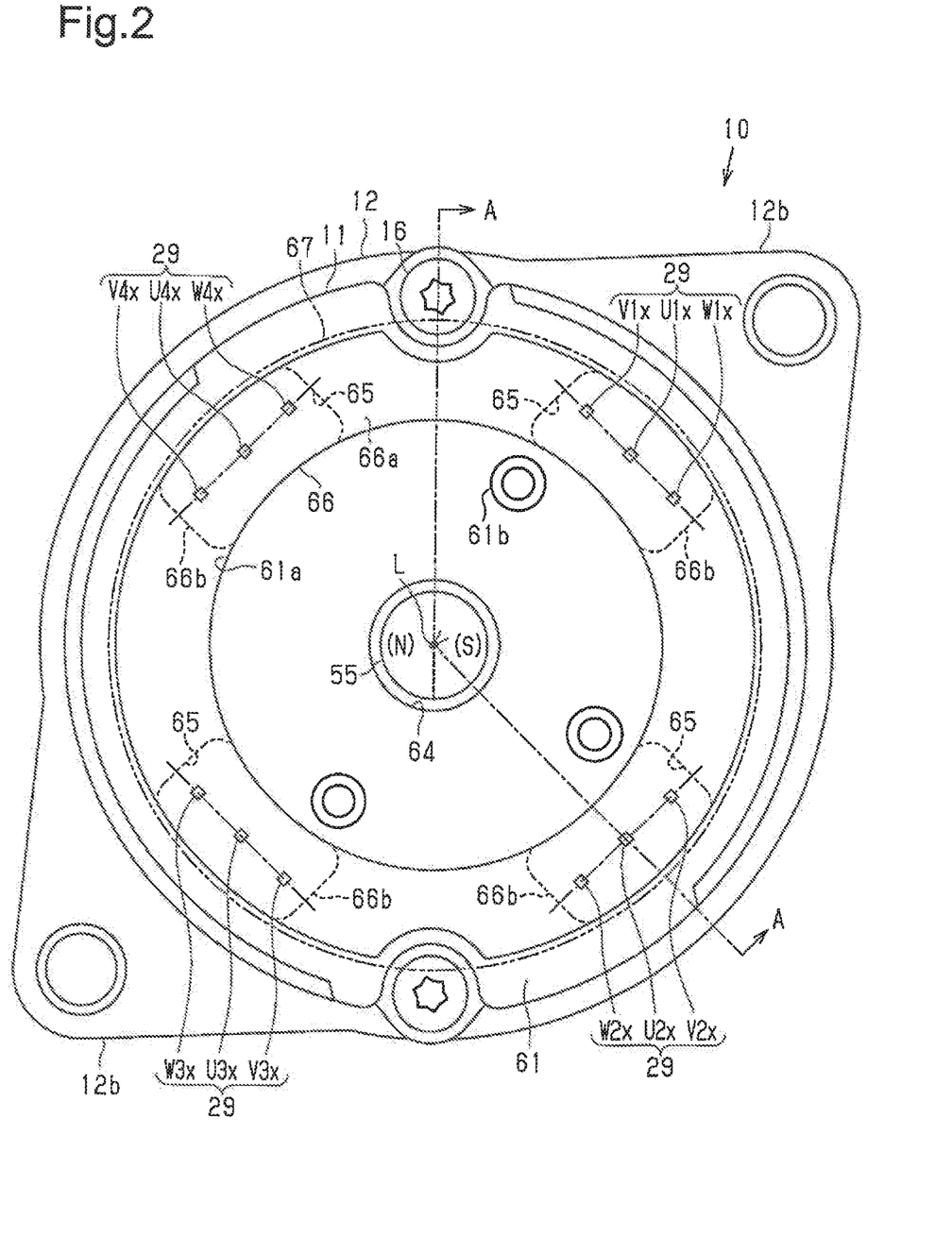
FIG. 2 is a plan view of the motor of FIG. 1 as viewed from a rear side.

A motor (brushless motor) 10 of the present embodiment shown in FIGS. 1 and 2 includes a rear frame 11, a front frame 12, and an annular stator 13 sandwiched in an axial direction of the motor 10 by the rear frame 11 and the front frame 12. A rotor 15 including a rotation shaft 14 is arranged inside the stator 13. The front frame 12 holds an output side of the motor 10 (portion near joint 53, which will be described later), and the rear frame 11 holds a non-output side of the motor 10. FIG. 2 is a plan view of the motor 10 as viewed from the rear frame 11. Each of the frames 11 and 12 is fastened and fixed by a pair of through bolts 16 at positions on an outer circumferential side of the stator 13 not to be separated from each other. In addition, the rear frame 11 and the front frame 12 are made of aluminum, which is a non-magnetic material.

Stator

Figure 3:
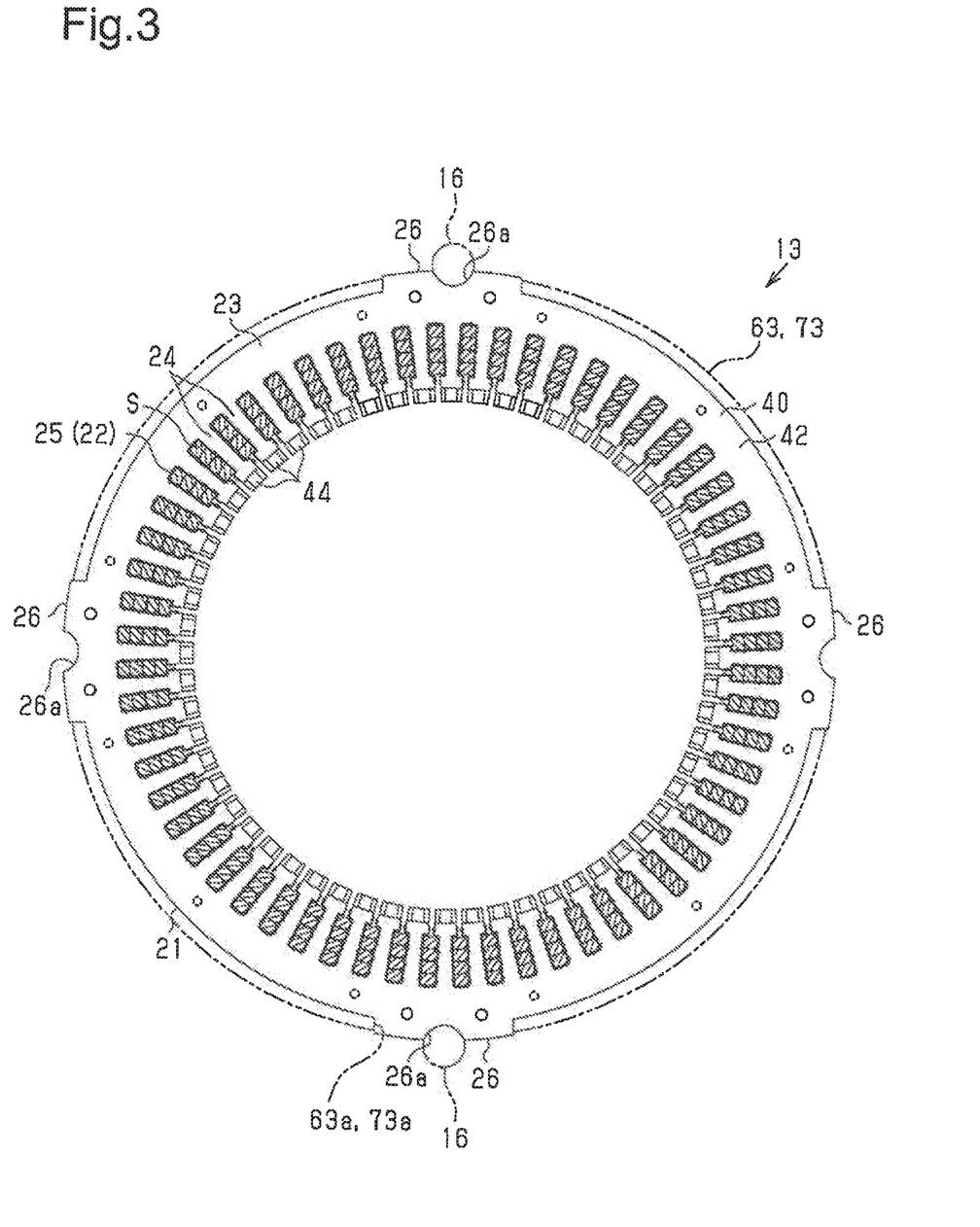
FIG. 3 is a plan view of a stator shown in FIG. 1.

As shown in FIGS. 1 and 3, the stator 13 includes an annular stator core 21 sandwiched between the frames 11 and 12 and armature windings 22 mounted on the stator core 21.

The stator core 21 includes a tubular portion 23, which forms the outer circumference of that stator core 21, a plurality of (sixty in the present embodiment) teeth 24 extending radially inwardly from the tubular portion 23, and outer core projections 26 projecting radially outwardly from an outer circumferential surface of the tubular portion 23.

Four outer core projections 26 are formed at equal intervals (90-degree intervals) in a circumferential direction of the tubular portion 23. In addition, the outer core projections 26 extend in the axial direction from one axial end to the other axial end of the tubular portion 23. An outer end surface of each outer core projection 26 includes an engagement groove 26a recessed in an arcuate manner and extending in the axial direction.

Two of the outer core projections 26 located at 180-degree opposing positions are used by a pair of through bolts 16 for fastening (engagement). That is, the through bolts 16 are fitted into the engagement grooves 26a formed in the outer core projections 26, and the engagement grooves 26a are engaged with the through bolt 16 in the circumferential direction. The engagement restricts displacement of the stator core 21 in the circumferential direction.

Figure 5:
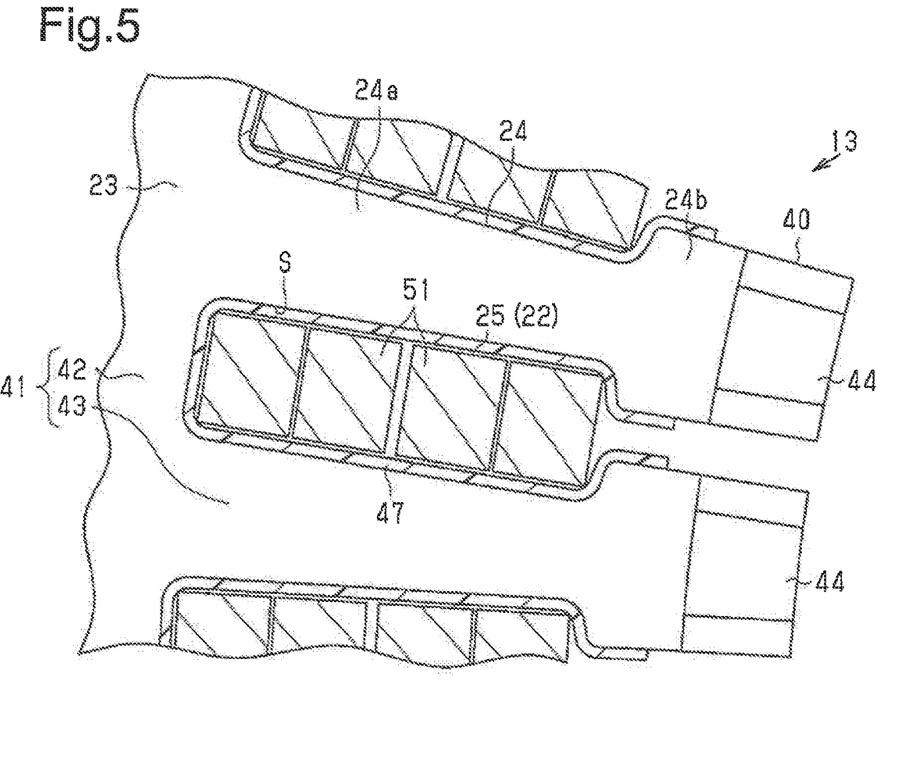
FIG. 5 is a partial enlarged view of the stator shown in FIG. 3.

As shown in FIG. 5, each tooth 24 includes a radially extending portion 24a tapered so that the circumferential width narrows toward the radially inward side. Each radially extending portion 24a includes a distal end (radially inner end) defining a wide portion 24b having a larger width in the circumferential direction than the radially extending portion 24a. The two circumferential end faces of each radially extending portion 24a are planar and parallel to an axial direction. Each circumferential end surface is parallel to the circumferential end face of the radially extending portion 24a that is adjacent in the circumferential direction.

Slots S extend between the teeth 24 to accommodate segment conductors 25 (refer to FIG. 6) of the armature windings 22. The slots S are formed by the circumferential end faces of the teeth 24 and the inner circumferential surface of the tubular portion 23 between the teeth 24. In the present embodiment, the teeth 24 are formed so that the circumferential end face of each radially extending portion 24a is parallel to the circumferential end face of the radially extending portion 24a adjacent in the circumferential direction. Thus, each slot S is substantially rectangular shape as viewed in the axial direction. In addition, each slot S extends through the stator core 21 in the axial direction and opens at the radially inner side. The number of slots S in the stator core 21 is the same as the number (sixty in the present embodiment) of teeth 24.

Stator Core

The stator core 21 shaped as described above-described is formed by laminating and integrating a plurality of magnetic steel plates.

Figure 4:
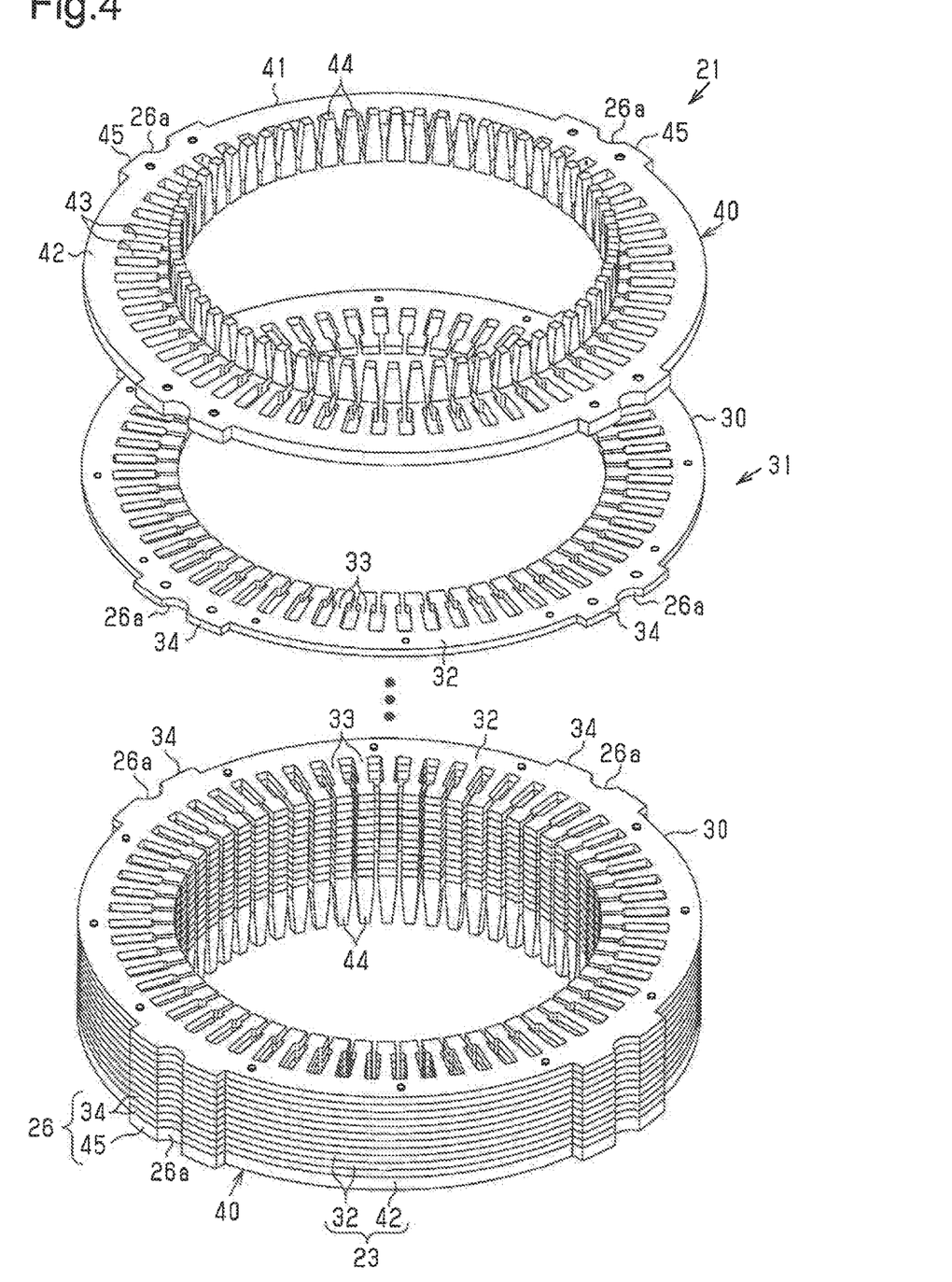
FIG. 4 is an exploded perspective view of a stator core shown in FIG. 3.

More specifically, as shown in FIG. 4, the stator core 21 includes a main core portion 31 and auxiliary core portions 40. The main core portion 31 is formed by laminating, swaging, and integrating a plurality of core sheets 30, which are formed by pressing and stamping magnetic steel plates, in the axial direction. The auxiliary core portions 40 are fixed to the two axial ends of the main core portion 31. The auxiliary core portions 40 are identical in shape are provided on the two axial ends of the main core portion 31.

The core sheets 30 of the main core portion 31 are identical in shape and arranged so that their plate surfaces extend orthogonal to the axial direction. Each of the core sheets 30 has an annular portion 32, a plurality of tooth formation portions 33 extending radially inwardly from the annular portion 32, and a plurality of projections 34 projecting radially outwardly from the annular portion 32. The core sheets 30 are laminated so that the tooth formation portions 33 and the projections 34 overlap in the axial direction.

As shown in FIGS. 3 to 5, each auxiliary core portion 40 is formed by pressing a magnetic steel plate and includes a plate-like laminated region 41 laminated on the core sheet 30 located at one of the two axial ends of the main core portion 31. The laminated region 41 is laminated parallel and coaxial to the core sheets 30 of the main core portion 31. The auxiliary core portion 40 is thicker than each core sheet 30 of the main core portion 31.

The laminated region 41 includes an annular portion 42 overlapping the annular portion 32 of the main core portion 31 (core sheets 30) in the axial direction, a plurality of tooth formation portions 43 extending radially inwardly from the annular portion 42, and a plurality of projections 45 projecting radially outwardly from the annular portion 42. The annular portion 42, the tooth formation portions 43, and the projections 45 of the laminated region 41 are identical in shape respectively with the annular portion 32, the tooth formation portions 33, and the projections 34 of the main core portion 31 (core sheets 30), as viewed in the axial direction. The auxiliary core portion 40 is provided so that the annular portion 42, the tooth formation portions 43, and the projections 45 of the laminated region 41 respectively overlap the annular portion 32, the tooth formation portions 33, and the projections 34 of the main core portion 31 (the core sheet 30) in the axial direction.

The annular portions 32 and 42 of the main core portion 31 (the core sheet 30) and the auxiliary core portion 40 form the tubular portion 23 of the stator core 21. The tooth formation portions 33 and 43 form the teeth 24 of the stator core 21. The projections 34 and 45 form the outer core projections 26. The annular portions 32 and 42, the tooth formation portions 33 and 43, and the projections 34 and 45 are respectively identical in shape as viewed in the axial direction with the tubular portion 23, the teeth 24, and the outer core projection 26 and thus will not be described in detail.

The radially inner end (end near rotor 15) of each tooth formation portion 43 of the auxiliary core portion 40 includes a rotor opposing portion 44 extending axially outwardly (opposite to main core portion 31). The rotor opposing portion 44 is formed by outwardly bending the radially inner end of the tooth formation portion 43 at a right angle in the axial direction. As a result, the rotor opposing portion 44 is configured so that its plate surface (inner circumferential surface) faces the rotor 15 in the radial direction. The inner circumferential surface of the rotor opposing portion 44 is curved to have the same diameter as an inner diameter of the main core portion 31 (core sheets 30). In addition, the rotor opposing portion 44 has a trapezoidal shape in which the circumferential width narrows toward the distal end.

As shown in FIG. 5, a sheet-like insulating member 47 formed by an insulative resin material is arranged in each slot S of the stator core 21. Each insulating member 47 is bent back at the radially outer end of the corresponding slot S to extend along the wall surface of the slot S. Each insulating member 47 is inserted into the corresponding slot S in the axial direction and is slightly longer in the axial direction than the slot S. That is, the two axial ends of the insulating member 47 protrude outward from the two axial ends of the slot S.

Armature Windings

Figure 6:
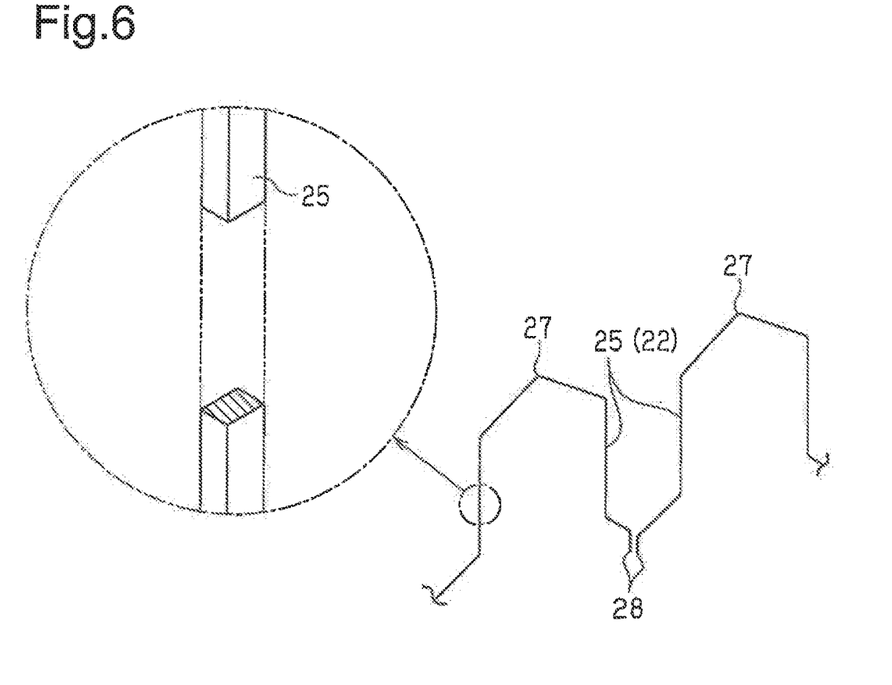
FIG. 6 is a perspective view of an armature winding (segment conductor) shown in FIG. 3.

As shown in FIGS. 1, 3, and 5, the armature windings 22 mounted on the stator core 21 includes the plurality of segment conductors 25 as shown in FIG. 6. The predetermined segments of the segment conductors 25 are connected to one another to form the armature windings 22 of three phases (U phase, V phase, and W phase) in a Y connection.

Each segment conductor 25 includes a portion that is axially inserted through the slot S and a folded portion 27 that projects out of the slot S toward the rear frame 11 and folded back into a substantially U shape. In addition, the portion of the segment conductor 25 projecting out of the slot S toward the front frame 12 define a joining portion 28 that is bent in the circumferential direction and joined with the joining portion 28 of predetermined segment conductors 25 through welding or the like. The armature windings 22 are mainly formed by the U-shaped type segment conductors 25, which include the folded portions 27. Lead wires 29, which will be described later, are formed by linear segment conductor that do not include the folded portions 27 (refer to FIG. 1).

The segment conductors 25 are formed from a wire material having the same cross-sectional shape (rectangular cross-sectional shape). A plurality of (four in the present embodiment) segment conductors 25 are arranged next to one another in each slot S. The segment conductors 25 in each slot S are arranged at the inner side of the insulating member 47. The insulating member 47 electrically insulates the segment conductors 25 and the stator core 21 (wall surface of slot S).

The armature windings 22 of the present embodiment includes three-phase windings of four systems, namely, first system windings U1, V1, and W1, second system windings U2, V2, and W2, third system windings U3, V3, and W3, and fourth system windings U4, V4, and W4 of a U phase, a V phase, and a W phase (refer to FIG. 9, the winding form of the winding 22 will be described later). As shown in FIG. 2, the armature winding 22 has three lead wires 29 of the U phase, the V phase, and the W phase for each system. The lead wires of the first system windings U1, V1, and W1 are first system lead wires U1$x$, V1$x$, and W1$x$, the lead wires of the second system windings U2, V2, and W2 are second system lead wires U2$x$, V2$x$, and W2$x$, the lead wires of the third system windings U3, V3, and W3 are third system lead wires U3$x$, V3$x$, and W3$x$, and the lead wires of the fourth system windings U4, V4, and W4 are fourth system lead wires U4$x$, V4$x$, and W4$x$. The lead wires 29 of each system phase are drawn out in the axial direction from the same side (portion toward rear frame 11) as the folded portions 27 of the segment conductors 25 (refer to FIG. 1).

Winding Form of Armature Winding

The winding form of the armature windings 22 of the present embodiment will now be described with reference to FIG. 7. Slot numbers "1" to "60" are sequentially assigned to the slots S of the stator 13 (stator core 21) toward one side in the circumferential direction.

Figure 7:
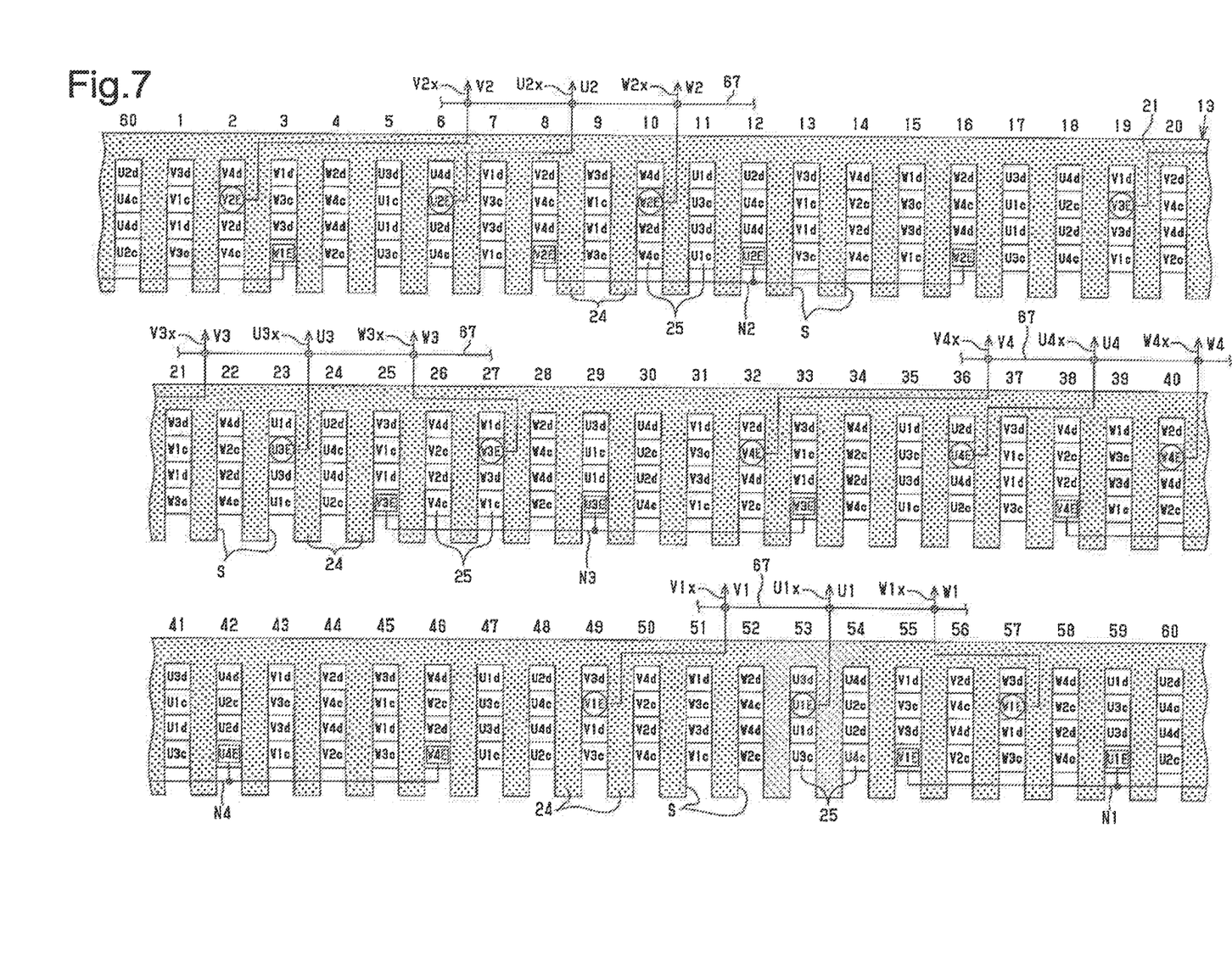
FIG. 7 is a net of the stator illustrating the winding form of the winding shown in FIG. 3.

FIG. 7 is a net of the stator 13 of the present embodiment. The armature windings 22 of the present embodiment include the three-phase windings of four systems, namely, the first system windings U1, V1, and W1, the second system windings U2, V2, and W2, the third system windings U3, V3, and W3, and the fourth system windings U4, V4, and W4. In FIG. 7, the first system winding U1 of the U phase is indicated by "U1$c$" and "U1$d$," the first system winding V1 of the V phase is indicated by "V1$c$" and "V1$d$," and the first system winding W1 of the W phase is indicated by "W1$c$" and "W1$d$." The second system winding U2 of the U phase is indicated by "U2$c$" and "U2$d$," the second system winding V2 of the V phase is indicated by "V2$c$" and "V2$d$," and the second system winding W2 of the W phase is indicated by "W2$c$" and "W2$d$." The third system winding U3 of the U phase is indicated by "U3$c$" and "U3$d$," the third system winding V3 of the V phase is indicated by "V3$c$" and "V3$d$," and the third system winding W3 of the W phase is indicated by "W3$c$" and "W3$d$." The fourth system winding U4 of the U phase is indicated by "U4$c$" and "U4$d$," the fourth system winding V4 of the V phase is indicated by "V4$c$" and "V4$d$," and the fourth system winding W4 of the W phase is indicated by "W4$c$" and "W4$d$." FIG. 7 also shows "U1E" to "W4E," which will be described later.

In the present embodiment, one slot S is set to have an electrical angle of 30° (mechanical angle of 6°), and twelve slots S are set to have an electrical angle of 360° (mechanical angle of 72°). Therefore, with regard to the winding form of the armature winding 22, for the phase of each system, twelve successive slots S form a cycle, that is, five cycles are formed in the circumferential direction. The lead wires 29 (U1x to W4x) at the terminal ends are set at four locations in system units because the armature windings 22 are of four systems.

The winding form of the first system winding V1 and the third system winding V3 of the V phase will now be described as a representative example with reference to FIG. 8. In slot number "1," "V1c" located at the second position from the radially outer side of the slot S is the insertion position. At this position, the segment conductor 25 forming the first system winding V1 extends, for example, from the lower side toward the upper side of the plane of FIG. 8. Next, the folded portion 27 of the segment conductor 25 extends to slot number "7." In slot number "7," the insertion position of the first "V1c" is located at the first position from the radially inner side of the slot S. At this position, the segment conductor 25 extends, for example, from the upper side toward the lower side of the plane of FIG. 8 and is joined with the adjacent segment conductor 25 at the joining portion 28. Next, the joined adjacent segment conductor 25 extends to slot number "13." In slot number "13," "V1c" located at the second position from the radially outer side of the slot S is the insertion position. At this position, the segment conductor 25 extends, for example, from the lower side toward the upper side of the plane of FIG. 8, and the segment conductor 25 is wound in a wave winding (distributed winding) repeated in five cycles In addition, "V1c" is the first lap of the first system winding V1, and "V1d" is a second lap of the first system winding V1. In slot number "1," "V1d" located at the second position from the radially inner side of the slot S is the insertion position. At this position, the segment conductor 25 forming the first system winding V1 of the second cycle extends, from example, from the lower side toward the upper side of the plane of FIG. 8. Next, the folded portion 27 of the segment conductor 25 extends to slot number "7." In slot number "7," "V1d" located at the first position from the radially outer side of the slot S is the insertion position. At this position, the segment conductor 25 extends, for example, from the upper side toward the lower side of the plane of FIG. 8 and is joined with the adjacent segment conductors 25 at the joining portion 28. Next, the joined adjacent segment conductor 25 extends to slot number "13." In slot number "13," "V1d" located at the second position from the radially inner side of the slot S is the insertion position. At this position, the segment conductor 25 extends, for example, from the lower side toward the upper side of the plane of FIG. 8, and the segment conductor 25 is wound in a wave winding repeated in five cycles. The first system winding V1 of the first lap located at "V1c" and the first system winding V1 of the second lap located at "V1d" are joined with each other at circumferential ends.

In slot number "1," "V3c" located at the first position in the radially inner side of the slot S is the insertion position. At this position, the segment conductor 25 forming the third system winding V3 extends, for example, from the upper side toward the lower side of the plane of FIG. 8 and is joined with the adjacent segment conductor 25 at the joining portion 28. Next, the joined adjacent segment conductor 25 extends to slot number "7." In slot number "7," "V3c" located at the second position from the radially outer side of the slot S is the insertion position. At this position, the segment conductor 25 extends, for example, from the lower side toward the upper side of the plane of FIG. 8. Next, the folded portion 27 of the segment conductor 25 extends to slot number "13.". In slot number "13," the first "V3c" at the radially inner side of the slot S is the insertion position. At this position, the segment conductor 25 extends, for example, from the upper side toward the lower side of the plane of FIG. 8 and wound in a wave winding repeated in five cycles. The third system winding V3 is configured to have a waveform that alternates with the first system winding V1.

In addition, "V3c" is a first lap of the third system winding V3, and "V3d" is a second lap of the third system winding V3. In slot number "1," "V3d" located at the first position in the radially outer side of the slot S is the insertion position. At this position, the segment conductor 25 forming the third system winding V3 of the second lap extend, for example, from the upper side toward the lower side of the plane of FIG. 8 and is joined with the adjacent segment conductor 25 at the joining portion 28. Next, the joined adjacent segment conductor 25 extends to slot number "7." In slot number "7," "V3d" located at the second position from the radially inner side of the slot S is the insertion position. At this position, the segment conductor 25 extends, for example, from the lower side toward the upper side of the plane of FIG. 8. Next, the folded portion 27 of the segment conductor 25 extends to slot number "13." In slot number "13," "V3d" located at the first position from the radially outer side of the slot S is the insertion position. At this position, the segment conductor 25 extends, for example, from the upper side toward the lower side of the plane of FIG. 8 and is wound in a wave winding repeated in five cycles. Like the first system winding V1, the third system winding V3 of the first lap located at "V3c" and the third system winding V3 of the second lap located at "V3d" are joined with each other at circumferential ends.

As described above, the segment conductors 25 forming the first system winding V1 and the third system winding V3 of the V phase are accommodated in the same slots S, namely, slot numbers "1," "7," "13," and so on. In addition, in the first and third system windings V1 and V3 of the present embodiment, when plotting the insertion positions "V1c," "V1d," "V3c," and "V3d" of the segment conductors 25, the insertion positions "V1c," "V1d," "V3c," and "V3d" alternately switch in the radial direction. In other words, the segment conductors 25 are wound at the same angle with the same length to the next slot S to allow for common components of the segment conductors 25 to be used as much as possible.

Referring to FIG. 7, the segment conductors 25 of the second system winding V2 and the fourth system winding V4 are arranged in the slots S arranged adjacent in the circumferential direction to the slots S accommodating the segment conductors 25 of the first and third system windings V1 and V3. Specifically, the segment conductors 25 of the second system winding V2 and the fourth system winding V4 are arranged in slot numbers "2," "8," "14," and so on. In the same manner as the segment conductors 25 of the first and third system windings V1 and V3, the second and fourth system windings V2 and V4 form wave windings having alternating waveforms.

With respect to the W phase, the segment conductors 25 of the first system winding W1 and the third system winding W3 are arranged adjacent in the circumferential direction to the slots S accommodating the second system winding V2 and the fourth system winding V4. Specifically, the segment conductors 25 of the first system winding W1 and the third system winding W3 are arranged in slot numbers "3," "9," "15," and so on. The first and third system windings W1 and W3 form wave windings having alternating waveforms.

The segment conductors 25 of the second system winding W2 and the fourth system winding W4 are arranged adjacent in the circumferential direction to the slots S accommodating the second and fourth system windings W2 and W4. Specifically, the segment conductors 25 of the second system winding W2 and the fourth system winding W4 are arranged in slot numbers "4," "10," "16," and so on. The second and fourth system windings W2 and W4 form wave windings having alternating waveforms.

With respect to the U phase, the segment conductors 25 of the first system winding U1 and the third system winding U3 are arranged adjacent in the circumferential direction to the slots S accommodating the second and fourth system windings W2 and W4. Specifically, the segment conductors 25 of the first system winding U1 and the third system winding U3 are arranged in slot numbers "5," "11," "17," and so on. The first and third system windings U1 and U3 form wave windings having alternating waveforms.

The segment conductors 25 of the second system winding U2 and the fourth system winding U4 are arranged adjacent in the circumferential direction to the slots S accommodating the first and third system windings U1 and U3. Specifically, the segment conductors 25 of the second system winding U2 and the fourth system winding U4 are arranged in slot numbers "6," "12," "18," and so on. The second and fourth system windings U2 and U4 form wave windings having alternating waveforms.

In FIG. 7, "U1E," "V1E," and "W1E" marked by circles and located at the second position from the radially outer side of the corresponding slot S serve as initiating points of the lead wires U1x, V1x, and W1x at the terminal ends of the first system windings U1, V1, and W1. In the same manner, "U2E," "V2E," and "W2E" marked by circles serve as initiating points of the lead wires U2x, V2x, and W2x at the terminal ends of the second system windings U2, V2, and W2, "U3E," "V3E," and "W3E" marked by circles serve as initiating points of the lead wires U3x, V3x, and W3x at terminal ends of the third system windings U3, V3, and W3, and "U4E," "V4E," and "W4E" marked by circles serve as initiating points of the lead wires U4x, V4x, and W4x at the terminal ends of the fourth system windings U4, V4, and W4. As apparent from FIG. 7, the lead wires 29 (U1x, . . . , W4x) of the systems are separated from one another by an angle of 90° (mechanical angle), the first and third systems are separated by an angle of 180°, and the second and fourth systems are separated by an angle of 180°. The same applies to each of the U, V and W phases.

Figure 9:
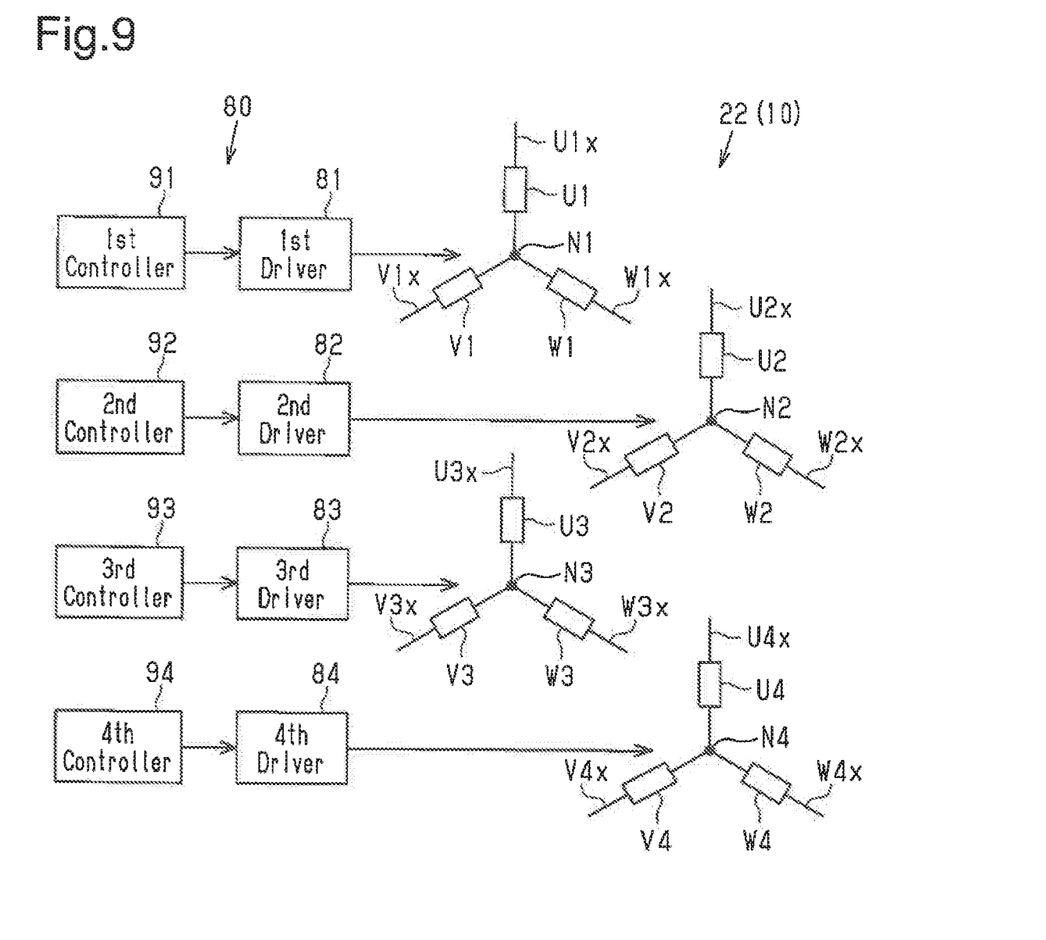
FIG. 9 is an electric block diagram illustrating power supplying modes of the motor shown in FIG. 1.

In FIG. 7, "U1E," "V1E," and "W1E" marked by squares and located at the first position from the radially inner side of the slot S are joined with one another to form a neutral point N1 of the Y connection of the first system windings U1, V1, and W1 (refer to FIG. 9). In the same manner, "U2E," "V2E," and "W2E" marked by squares are joined with one another to form a neutral point N2 of the Y connection of the second system windings U2, V2, and W2. Further, "U3E," "V3E," and "W3E" marked by squares are joined with one another to form a neutral point N3 of the Y connection of the third system windings U3, V3, and W3. Moreover, "U4E," "V4E," and "W4E" are joined with one another to form a neutral point N4 of a Y connection of the fourth system windings U4, V4, and W4.

Rotor

As shown in FIG. 1, the rotor 15 includes the rotation shaft 14 supported by bearings 11a and 12a supported on the frames 11 and 12, a cylindrical rotor core 51 fixed to the rotation shaft 14 and rotated integrally with the rotation shaft 14, and a plurality (ten in the present embodiment) of field magnets 52 fixed to an outer circumferential surface of the rotor core 51. Each field magnet 52 is formed by a ferrite magnet, and ten field magnets 52 are arranged so that their magnetic poles (NS poles) alternately differ in the circumferential direction.

Axial lengths of the rotor core 51 and the field magnet 52 are set to be substantially equal to an axial length of an inner circumferential portion of the stator core 21 (i.e., length from distal end of rotor opposing portion 44 in one auxiliary core portion 40 to distal end of rotor opposing portion 44 in other auxiliary core portion 40). That is, in the radial direction, each field magnet 52 entirely opposes the stator core 21 including the inner circumferential surface of the main core portion 31 and the rotor opposing portion 44 of each auxiliary core portion 40.

The rotation shaft 14 includes a distal end (left end as viewed in FIG. 1) that extends through the front frame 12 and projects out of the motor 10. The joint 53 is coupled to the distal end of the rotation shaft 14 and rotated integrally with the rotation shaft 14. The joint 53 is connected to an external device (not shown), and transmits rotation of the rotation shaft 14 to the external device. Further, the rotor 15 (rotation shaft 14) rotates when receiving the rotating magnetic field generated by the stator 13.

Frame

As shown in FIG. 1, the rear frame 11 includes a substantially disc-shaped opposing wall 61 and a cylindrical stator holding portion 62. The opposing wall 61 opposes the stator 13 in the axial direction, and the stator holding portion 62 extends from an outer circumferential edge of the opposing wall 61 in the axial direction of the motor 10. The front frame 12 has substantially the same configuration as the rear frame 11 and includes a substantially disc-shaped opposing wall 71, opposing the stator 13 in the axial direction, and a cylindrical stator holding portion 72, extending from the opposing wall 71 in the axial direction of the motor 10. The bearings 11a and 12a are respectively held by radially central portions of the opposing walls 61 and 71 in the frames 11 and 12. The bearings 11a and 12a are arranged coaxially. Fixing portions 12b extend radially outward from the outer circumferential surface of the front frame 12 (refer to FIG. 2). The fixing portion 12b is fixed to a predetermined motor mounting portion (not shown) by screws or the like.

As shown in FIGS. 1 and 3, the stator holding portions 62 and 72 respectively include fitting portions 63 and 73 into which the axial ends of the stator core 21 are fitted. The fitting portions 63 and 73 are cylindrical and have an inner diameter that substantially coincides with an outer diameter of the tubular portion 23 of the stator core 21. Cutouts 63a and 73a are formed in the fitting portions 63 and 73 at positions corresponding to the outer core projections 26 to receive the outer core projections 26. The inner circumferential surfaces of the fitting portions 63 and 73 are in radial contact with the outer circumferential surface of the stator core 21 (portions where outer core projections 26 are not formed). This aligns the frames 11 and 12 and the stator core 21 and hold the stator core 21 in the radial direction with the fitting portions 63 and 73.

As shown in FIG. 1, a central portion of the opposing wall 61 of the rear frame 11 includes a shaft insertion hole 64 through which the rotation shaft extends in the axial direction. The rotation shaft 14 includes a basal end (right end in FIG. 1) inserted into the shaft insertion hole 64. A sensor magnet 55 is fixed to the basal end of the rotation shaft 14 by a support member 54.

The sensor magnet 55 is disc-shaped and has a center axis that coincides with the axis L of the rotation shaft 14. The planar end face of the sensor magnet 55 extends perpendicular to the axis L of the rotation shaft 14. In addition, the sensor magnet 55 is magnetized so that one half of the axially outer end surface is an N pole and the outer half is an S pole (refer to FIG. 2).

As shown in FIGS. 1 and 2, an outer circumferential portion in an axially outer end surface of the opposing wall 61 of the rear frame 11 includes an annular groove 61a recessed around the axis L. The annular groove 61a includes four outlet holes 65 extending through the opposing wall 61 in the axial direction. The four outlet holes 65 are formed at separated at angular intervals of 90° in the circumferential direction in correspondence with the lead wires 29 (U1x to W4x) of each system. The lead wires 29 of each system are drawn out of the axial outer side (side opposite to stator 13) of the opposing wall 61 through the corresponding outlet holes 65.

An annular rubber member 66 containing magnetic powder such as ferrite powder and iron powder is coupled to the opposing wall 61 of the rear frame 11 from the axially outer side of the opposing wall 61. The rubber member 66 includes an annular portion 66a, which is annular and extends around the axis L of the rotation shaft 14, and four blocking portions 66b, which are fitted into the four outlet holes 65 and extending in the axial direction from the annular portion 66a. The annular portion 66a is formed integrally with the blocking portions 66b. The density of the magnetic powder contained in the rubber member 66 is uniform throughout the rubber member 66.

The annular portion 66a is press-fitted into the annular groove 61a, which is recessed in the axially outer end surface of the opposing wall 61. The annular portion 66a has an axial thickness (axial thickness of portion free from blocking portions 66b) that is uniform in the circumferential direction. It is preferable that the annular portion 66a overlaps the armature winding 22 of the stator 13 as viewed in the axial direction. Each blocking portion 66b has substantially the same shape as the corresponding outlet hole 65 as viewed in the axial direction and is fitted in the outlet hole 65. In addition, the blocking portions 66b each include a plurality of insertion holes 66c through which the lead wires 29 of each phase of the corresponding system are inserted. That is, the blocking portion 66b surrounds each lead wire 29 and blocks each outlet hole 65.

The lead wires 29 of each phase of each system are supported by the blocking portion 66b. The lead wires 29 are arranged at equal intervals (90° intervals) in the circumferential direction in the order of the first to fourth systems. Further, the lead wires 29 of the first and third systems are provided at opposing positions separated by 180° from each other in the circumferential direction of the rotation shaft 14. The lead wires U1x, V1x, and W1x and lead wires U3x, V3x, and W3x of the U phase, V phase, and W phase are also arranged so that same phases are located at opposing positions separated by 180° from each other. In the same manner, the lead wires 29 of the second and fourth systems are provided at opposing positions separated by 180° from each other in the circumferential direction of the rotation shaft 14. The lead wires U2x, V2x, and W2x and lead wires U4x, V4x, and W4x of the U phase, V phase, and W phase are also arranged so that same phases are located at opposing positions separated by 180° from each other. The lead wires 29 of each phase of each system are arranged at point symmetrical positions about the axis L, and the distance between the phases of each system from the sensor magnet 55 is set to be equal.

A control board 67 configuring a control device 80 (refer to FIG. 9), which will be described later, is arranged on the axially outer side of the opposing wall 61 of the rear frame 11 extending perpendicular to the axis L of the rotation shaft 14 (refer to FIG. 1). The control board 67 is circular shape and arranged so that its center overlaps the axis L of the rotation shaft 14 (refer to FIG. 2). The control board 67 is in axial contact with a plurality of seat portions 61b provided on the axially outer end face of the opposing wall 61. The control board 67 is fixed to the seat portions 61b by screws 61c.

The lead wires 29 (U1x to W4x) of each phase of each system drawn out of the stator 13 through the outlet hole 65 are connected to the control board 67. In this case, the lead wires 29 of each system are arranged at angular intervals of 90°, and the first and third systems are separated from each other by an angle of 180°, and the second and fourth systems are separated from each other by an angle of 180°. The U, V, and W phases are arranged in the same manner. The lead wires 29 of each phase of each system are positioned so that same phases are located on concentric circles of which the center is the axis L of the rotation shaft 14. In addition, the three-phase lead wires 29 in the same system are arranged next to one another along a straight line.

In addition, the control board 67 includes a rotation detection sensor 68 or the like, such as a Hall IC or a TMR type magnetic sensor, in addition to electronic components forming first to fourth drivers 81 to 84 and first to fourth controllers 91 to 94 (refer to FIG. 9), which will be described later, to generate a driving current supplied from the lead wires 29 of each phase of each system.

The rotation detection sensor 68 is provided on a surface near the opposing wall 61 of the control board 67 opposing the sensor magnet 55 in the axial direction. In addition, the rotation detection sensor 68 is arranged so that its center overlaps the axis L of the rotation shaft 14. The rotation detection sensor 68 detects a change in magnetic field generated by the rotation of the sensor magnet 55, and a control circuit detects rotation information of the sensor magnet 55 (rotation angle, rotation direction, rotation speed, or the like) based on output signals from the rotation detection sensor 68.

Each of the drivers 81 to 84 and each of the controllers 91 to 94 provided on the control board 67 control a driving current supplied from each lead wire 29 to the armature windings 22 (U1 to W4) based on the rotation information of the rotation shaft 14 (the sensor magnet 55). This allows the rotor 15 (the rotation shaft 14) to be rotated and driven in the desire manner.

Power Supplying Modes of Motor

FIG. 9 shows power supplying modes of the motor 10 of the present embodiment. The control device 80 for controlling the motor 10 includes a first driver 81, a second driver 82, a third driver 83, and a fourth driver 84 that are independent from one another and include inverter circuits to generate three-phase driving currents (U phase, V phase, and W phase) from a DC power supply. The first driver 81 supplies power to the first system windings U1, V1, and W1, the second driver 82 supplies power to the second system windings U2, V2, and W2, the third driver 83 supplies power to the third system windings U3, V3, and W3, and the fourth driver 84 supplies power to the fourth system windings U4, V4, and W4. The U-phase, V-phase, and W-phase driving currents are set to have a phase difference of 120° from one another. The first controller 91, the second controller 92, the third controller 93, and the fourth controller 94 are independently provided for each of these drivers 81 to 84, and each of the controllers 91 to 94 controls the driving currents supplied to the armature windings 22 of each phases of each system from each of the drivers 81 to 84.

In the present embodiment, as shown in FIG. 7, the same driving current of each phase is supplied from the first driver 81 and the third driver 83 to the first system windings U1, V1, and W1 and the third system windings U3, V3, and W3 inserted into the same slot S. Likewise, the same driving current of each phase is supplied from the second driver 82 and the fourth driver 84 to the second system windings U2, V2, and W2 and the fourth system windings U4, V4, and W4 inserted into the same slot S. That is, the first system and the third system are operated as if in the same system, and the second system and the fourth system are each is operated as if in the same system. Thus, although there are four systems in structure, control is executed as if there are two systems. In addition, the combination of the first system and the third system is separated by 30° in an electrical angle from the combination of the second system and the fourth system. Therefore, a phase difference of 30° is set between the systems. In the stator 13 which is supplied with driving currents as described above, a rotating magnetic field is generated to rotate and drive the rotor 15 (rotation shaft 14).

In addition, the lead wires U1x, V1x, and W1x of the first system windings U1, V1, and W1 and the lead wires U3x, V3x, and W3x of the third system windings U3, V3, and W3 to which the same driving current is supplied for each phase are arranged at opposing positions separated by 180° with the axis L of the rotation shaft 14 located in between. That is, when the lead wires U1x, V1x and W1x and the lead wires U3x, V3x, and W3x are energized, the lead wires U1x, V1x, and W1x and the lead wires U3x, V3x, and W3x are arranged so that the magnetic fields generated around their conductors are offset between the first system and the third system in the vicinity of the rotation shaft 14. In addition, the lead wires U2x, V2x, and W2x of the second system windings U2, V2, and W2 and the lead wires U4x, V4x, and W4x of the fourth system windings U4, V4, and W4 to which the same driving current is supplied for each phase are arranged at opposing positions separated by 180° with the axis L of the rotation shaft 14 located in between. That is, when the lead wires U2x, V2x, and W2x and the lead wires U4x, V4x, and W4x are energized, the magnetic fields generated around their conductors are offset between the second system and the fourth system in the vicinity of the rotation shaft 14. This reduces the influence of the magnetic fields generated around the lead wires 29 (U1x to W4x) during energization with respect to changes in the magnetic field at the sensor magnet 55 arranged on the axis L of the rotation shaft 14 and increases the rotation detection accuracy of the rotation detection sensor 68.

The advantageous effects of the present embodiment will be described.

(1) The stator 13 of the motor 10 includes the windings U1 to W4 of the systems that are independently operable. Further, the windings U1 to W4 of different systems and the same phase are mixed in the same slot S of the stator 13 (the stator core 21). The windings of the present embodiment are formed by the windings U1 to W4 of four systems, and the windings U1 to W4 of two systems and of the same phase are be mixed in all of the slots S. The driving current of the same phase is supplied to the windings U1 to W4 of different systems and the same phase arranged in the same slot S. In other words, the motor has redundancy by providing the windings U1 and W4 of different systems, which are independent from each other in structure, in the same slot, and the same driving current is used to operate as if the windings U1 to W4 are in the same system. In this way, the present embodiment allows for simple power supply control with the windings U1 to W4 for a plurality of systems.

(2) The lead wires U1x to W4x of the windings U1 to W4 of different systems and the same phase arranged in the same slot S are arranged at opposing positions separated by 180° from each other with the rotation shaft 14 of the rotor 15 located in between. Therefore, it is possible to offset the magnetic fields generated around the conductors of the lead wires U1x to W4x in the vicinity of the rotation shaft 14 during energization. Therefore, in the motor 10 of the present embodiment in which the sensor magnet 55 is arranged on the rotation shaft 14, the influence on the magnetic field of the sensor magnet 55 is reduced, and the rotation is detected by the rotation detection sensor 68 with higher accuracy.

Figure 8:
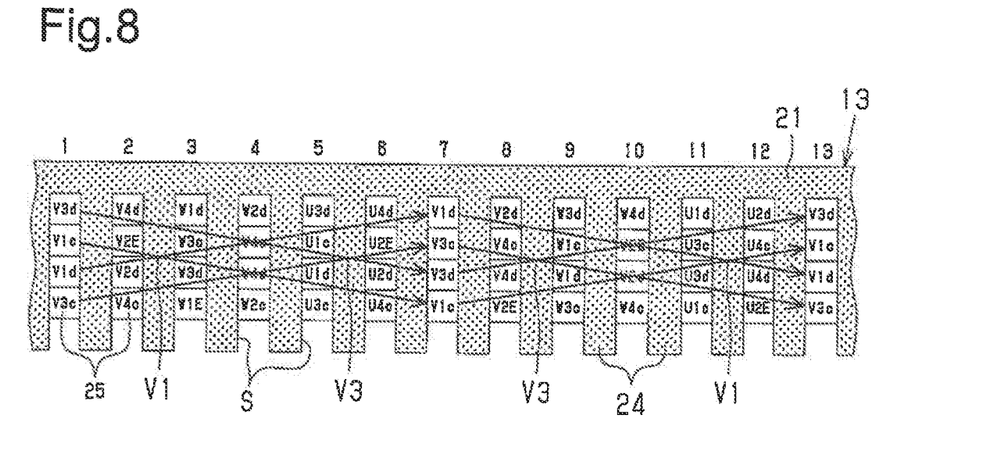
FIG. 8 is a net of part of the stator illustrating the winding form of the winding shown in FIG. 7.

(3) The windings U1 to W4 of different systems and the same phase arranged in the same slot S are arranged in a state in which their radial positions are alternately switched in the slots of a predetermined interval (refer to FIG. 8). That is, since the winding forms of the windings U1 to W4 are symmetrical in different systems, for example, in the motor 10 of the present embodiment forming the windings U1 to W4 by connecting the segment conductors 25 having a predetermined length, the parts of the segment conductors 25 can be commonly used.

(4) The control device 80 is configured so that independent drivers 81 to 84 are allocated to each of the windings U1 to W4 of the plurality of systems (the four systems). This provides redundancy to the windings U1 to W4 and the drivers 81 to 84. Further, since the controllers 91 to 94 are allocated to each of the plurality of drivers 81 to 84, in addition to the windings U1 to W4 and the drivers 81 to 84, the controllers 91 to 94 are provided with redundancy.

It should be apparent to those skilled in the art that the present invention may be embodied in many other specific forms without departing from the spirit or scope of the invention. Particularly, it should be understood that the present invention may be embodied in the following forms.

Although the stator 13 of the motor 10 is provided for the windings U1 to W4 of four systems, the number of systems is not limited and may be three, five, or greater.

Although the windings U1 to W4 of different systems are mixed in all the slots S, a slot S in which the windings U1 to W4 of different systems are mixed and a slot S in which the windings U1 to W4 of different systems are not mixed may be provided The number of systems of the windings U1 to W4 mixed in the slot S is two systems but may be three systems or more.

Although the drivers 81 to 84 of the control device 80 are independent from the independent windings U1 to W4 and the controllers 91 to 94 are also provided independently, the controller can be commonly used for the independent drivers 81 to 84. In other words, it is possible to make the controller common while providing the windings U1 to W4 and the drivers 81 to 84 with redundancy. In addition, the driver may be commonly used for the independent windings U1 to W4. The same driver or the same controller controlling the driver may be used while providing the windings U1 to W4 with redundancy.

The winding forms of the windings U1 to W4, the arrangement positions of the lead wires U1x to W4x and the like are merely examples and may be changed.

The segment conductor 25 forming the windings U1 to W4 has a rectangular cross-sectional shape but is not limited to such a shape. For example, the segment conductor 25 may have a circular cross-sectional shape.

Although the segment conductors 25 are used for the windings U1 to W4, general windings wound around continuous wires may be used.

The stator 13 (stator core 21) is configured to be sandwiched between the rear frame 11 and the front frame 12, but is not limited thereto. For example, the stator 13 may be fixed in a cylindrical case by shrinkage fitting or the like.

Although the auxiliary core portions 40 are located at the two axial sides of the stator core 21, the auxiliary core portions 40 do not have to be used, and the core sheets 30 used for the main core portion 31 may all be laminated.

The rubber member 66 coupled to the rear frame 11 is formed to contain magnetic powder such as ferrite powder and iron powder, but a normal rubber member not containing magnetic powder may be used. Further, the rubber member 66 does not have to be annular in shape. In addition, although the rubber member 66 does not have to be formed by one component.

The control board 67 does not have to be circular in shape. For example, the control board 67 may have a quadrangular shape or a combination of a circular shape and a quadrangular shape.

The control device 80 (the control board 67) is integrally provided in the motor 10, but the control device 80 and the motor 10 may be separately provided.

In addition to the above modifications, the configuration of the motor 10 and the configuration and control of the control device 80 may be changed as required.

The present examples and embodiments are to be considered as illustrative and not restrictive, and the invention is not to be limited to the details given herein, but may be modified within the scope and equivalence of the appended claims.

The invention claimed is:

1. A brushless motor comprising:
   a stator including a stator core and a plurality of windings, wherein the stator core includes teeth arranged next to one another in a circumferential direction and slots formed between the teeth, the windings are inserted into the slots, and the windings are all wound around the stator core as three-phase windings of a plurality of systems;
   a control device configured to generate a three-phase driving current; and
   a rotor rotated and driven when the three-phase windings are supplied with the three-phase driving current, wherein
   the windings are operable independently in each system,
   some of the windings that are at least two windings of different systems and the same phase are arranged mixed in the same slot, and
   the driving current of the same phase is supplied to the some of the windings of different systems and the same phase arranged in the same slot.

2. The brushless motor according to claim 1, wherein
   the windings include windings of four or more systems, and
   the some of the windings of different systems and the same phase are mixed in each of the slots.

3. The brushless motor according to claim 1, wherein
   the some of the windings of different systems and the same phase arranged in the same slot each includes a lead wire, and
   the lead wires are arranged at opposing positions separated by 180° degrees from each other with a rotation shaft of the rotor located in between.

4. The brushless motor according to claim 1, wherein the some of the windings of different systems and the same phase arranged in the same slot are arranged in a state in which their radial positions are alternately switched in the slots of a predetermined interval.

5. The brushless motor according to claim 1, wherein
   the control device includes a plurality of drivers that generate and supply the driving current, and
   the drivers are allocated to each winding of the plurality of systems.

6. The brushless motor according to claim 5, wherein the control device includes a plurality of controllers configured to independently control the plurality of drivers.

7. The brushless motor according to claim 1, wherein
   the control device includes a common driver that generates and supplies the driving current, and
   the common driver is allocated to the some of the windings of different systems in the same slot.

8. A brushless motor control device configured to control a brushless motor including a stator, wherein the stator includes a stator core and a plurality of windings, the stator core includes teeth arranged next to one another in a circumferential direction and slots formed between the teeth, the windings are inserted into the slots, and the windings are all wound around the stator core as three-phase windings of a plurality of systems, the brushless motor control device is characterized in that:
   the control device is configured to rotate and drive a rotor when the three-phase windings is supplied with the three-phase driving current generated by the control device;
   the windings are operable independently in each system;
   some of the windings that are at least two windings of different systems and the same phase are arranged mixed in the same slot; and
   the control device supplies the driving current of the same phase to the some of the windings of different systems and the same phase arranged in the same slot.

* * * * *